United States Patent
De La Fuente

(10) Patent No.: US 7,715,175 B2
(45) Date of Patent: May 11, 2010

(54) SPECIAL URBAN TRANSFORMATION CENTER

(75) Inventor: Juan Garcia-Fuentes De La Fuente, La Coruña (ES)

(73) Assignee: Twelcon Electronica, S.L., La Coruna (ES)

( * ) Notice: Subject to any disclaimer, the term of this patent is extended or adjusted under 35 U.S.C. 154(b) by 1293 days.

(21) Appl. No.: 10/534,056

(22) PCT Filed: Nov. 6, 2003

(86) PCT No.: PCT/ES03/00567

§ 371 (c)(1),
(2), (4) Date: May 6, 2005

(87) PCT Pub. No.: WO2004/042171

PCT Pub. Date: May 21, 2004

(65) Prior Publication Data

US 2006/0150535 A1    Jul. 13, 2006

(30) Foreign Application Priority Data

Nov. 6, 2002    (ES) .............................. 200202680 U

(51) Int. Cl.
 *H02B 5/00*    (2006.01)
 *A47F 10/00*    (2006.01)
 *A47B 81/00*    (2006.01)
 *H05K 5/00*    (2006.01)

(52) U.S. Cl. ...................... 361/602; 52/36.1; 312/223.1; 454/184

(58) Field of Classification Search ................. 312/100, 312/223.1; 52/79.8, 79.6, 79.1, 169.1, 27.5, 52/28, 36.1, 36.2; 361/602; 454/184

See application file for complete search history.

(56) References Cited

U.S. PATENT DOCUMENTS

| | | | | |
|---|---|---|---|---|
| 1,474,864 A | * | 11/1923 | Vogt et al. | 52/36.2 |
| 1,816,034 A | * | 7/1931 | Wood | 361/622 |
| 1,817,062 A | * | 8/1931 | Byrnes et al. | 312/100 |
| 2,274,106 A | * | 2/1942 | Strong et al. | 312/100 |
| 2,480,568 A | * | 8/1949 | Garvin | 361/624 |
| 3,844,232 A | * | 10/1974 | Robinson | 109/7 |
| 4,090,230 A | * | 5/1978 | Fuller et al. | 361/617 |
| 4,417,527 A | * | 11/1983 | Williams et al. | 109/2 |
| 4,605,257 A | * | 8/1986 | Lang et al. | 296/26.03 |
| 5,394,468 A | * | 2/1995 | Wood | 379/453 |
| 5,476,316 A | * | 12/1995 | Batroney et al. | 312/287 |
| 5,638,646 A | * | 6/1997 | Shane | 52/79.1 |
| 5,950,373 A | * | 9/1999 | von Hoff et al. | 52/79.5 |

(Continued)

FOREIGN PATENT DOCUMENTS

CN    201167213    * 12/2008

(Continued)

*Primary Examiner*—Richard E Chilcot, Jr.
*Assistant Examiner*—Ryan D Kwiecinski
(74) *Attorney, Agent, or Firm*—Arent Fox LLP

(57) ABSTRACT

The invention relates to a special urban transformation center comprising a concrete support body (1) on which a cabinet made of sheet metal and vinyl ester (2) is placed and eyebolts (4) for placement thereof, which are located in the upper part. The plates (15) have locating elements for the low voltage and remote control panels. A base is also provided for leveling the steel outer structure. It also comprises an internal/external skeleton reinforced with crossbeams and four columns (20). The invention also has a polyester closing cover (6).

6 Claims, 4 Drawing Sheets

U.S. PATENT DOCUMENTS

| | | | |
|---|---|---|---|
| 6,823,639 B2 * | 11/2004 | Hampel | 52/598 |
| 6,969,130 B2 * | 11/2005 | Newton et al. | 312/223.1 |
| 2004/0000099 A1 * | 1/2004 | Gal | 52/27.5 |
| 2005/0257439 A1 * | 11/2005 | Sarver et al. | 52/79.1 |
| 2006/0181837 A1 * | 8/2006 | Sun et al. | 361/602 |
| 2008/0257639 A1 * | 10/2008 | Yamaguchi et al. | 181/198 |
| 2009/0021925 A1 * | 1/2009 | Heimann et al. | 361/818 |

FOREIGN PATENT DOCUMENTS

| | | |
|---|---|---|
| DE | 4008814 A | 9/1991 |
| EP | 0768741 A2 | 4/1997 |
| ES | 2089314T T3 | 10/1996 |
| ES | 2 075 886 A1 * | 7/2009 |
| FR | 2567559 A3 | 1/1986 |
| FR | 2644191 A1 | 9/1990 |
| KR | 2009037144 A * | 4/2009 |

* cited by examiner

SPECIAL URBAN TRANSFORMATION CENTER

CROSS-REFERENCE TO RELATED APPLICATION

This application is a National Stage entry of International Application No. PCT/ES2003/000567, filed Nov. 6, 2003, the entire specification claims and drawings of which are incorporated herewith by reference.

OBJECT OF THE INVENTION

The present descriptive report relates to a special urban transformation center, whose purpose is to be configured as a cabinet, whose interior, just like a closet, can be used to house every constituent element of a transformer station, composed of a transformer, transformer cells, a low voltage panel and a telecontrol panel, configured in an external housing that looks like a telephone cabin with two spaces for telephones and/or an antivandalic computer touch screen, to be used as a multimedia information center, resulting in a multipurpose invention.

FIELD OF THE INVENTION

This invention is meant to be applied within the industrial sector that is dedicated to the production of machines, mechanical parts, and auxiliary parts for telecommunication and companies dedicated to the distribution and transformation of electric energy, as well as publicity companies.

BACKGROUND OF THE INVENTION

To the knowledge of the applicant, there is no existent urban transformation center configured along the characteristics mentioned in this report, and providing at the same time an external housing that offers a configuration similar to that of a double telephone cabin provided, in the zone adapted for physically handicapped people and as an alternative, instead of a phone adapted for their use, with an antivandalic computer touch screen, with the purpose to configure it as a multimedia information point.

DESCRIPTION OF THE INVENTION

The special urban transformation center, proposed in this invention, is clearly a novelty within its field of application, presenting a sturdy construction, which incorporates a multifunctional structure, containing an internal closet, and at the same time a multipurpose structure, with the possibility of being integrated into the urban street furniture, of reduced size and equipped with spaces for normalized advertising.

More specifically, the special urban transformation center, object of this invention, is built based on a vertical body, which in the upper part has a roof made of polyester reinforced with fiberglass, meant to result in a zenithal closure, adopting the form of a spherical skullcap, explicitly in an elliptical configuration.

At the major sides of the basic body of the special urban transformation center, the invention is equipped with sliding doors, with transparent, polycarbonate windows of normalized sizes, in order to permit the incorporation of vertical urban publicity. In the zone that corresponds to one of the sliding, opening doors, the invention has the possibility to fully open the door of the internal cabinet that is housed in the interior.

The parts that serve to illuminate the interior of the cabinet are situated in the interior of the mentioned sliding doors and the interior of those doors is also suited for refurbishing the advertisement.

The telephones, situated at the narrowest sides, are illuminated with zenithal lights, and are installed at a normalized height on one side, and on the opposite side at a height that permits its use by physically handicapped people, which alternatively can be equipped with an antivandalic computer touch screen, with the purpose to configure it as a public information point. Below both of these telephones there is a flat table space, to be used as support by the public user and serving as well as protection against the doors that give access to the space that holds the low voltage panel with a Kilowatt Hour meter and telecontrol panel and the base for the four pillars.

This invention is formed by a metallic structure, called internal cabinet, which has a prismatic form, and double walls of steel and vinyl ester, firmly resting on a floor made out of concrete.

The invention, which holds in its interior a transformer center of medium up to/or low voltage, consisting of a transformer, has the particular feature that the cited transformer is situated at a higher position than the base (situated below ground-level) with the goal to reserve this inferior space for possibly spilled oil, and which is resting on two "U"-shaped beams used as rails situated in such a way that the upper lid of the cited transformer at the end of the installation process is situated at ground-level.

The medium voltage switchgear, which rests upon the mentioned transformer, is supported by four rectangular corners, with two transverse bars, which coincide with the existing separation between the two entrances of the medium voltage cables, and the protected outlet of the transformer.

The internal closet is closed with a grill on the upper part to partially evacuate the heat that is generated by the transformer, incorporating some lifting bolts.

On one of its sides, the invention has a door, which can be used for inspection of, and operating in, the frontal zone of the medium voltage switchgear, as well as another opening to be used for connecting medium voltage cables, modifying the off-circuit tap changer, voltage switchboard, monitoring of levels and checking the transformer's temperature. The heat that is produced by the transformer is evacuated to the exterior through the four pillars that function like chimneys, leaving from the internal closet through a grill situated in the inferior parts (specifically in the faces of the fronts), and in the superior part of the cabinet, being transported to the outside through drill holes practiced in the lower part of the hood, getting the renewal and the inflow of air at an atmospheric temperature through an inferior perimetrical entrance located in the lower part of the doors that are used to carry publicity.

Summarizing, the invention can be used by a plurality of users that may vary from the owner, to a telephone company, citizens and passersby as well as by advertising companies that only have access to the advertising compartment.

DESCRIPTION OF THE DRAWINGS

To complete this description, and with the purpose to help to a better understanding of the characteristics of this invention, this description is accompanied, as an integrated part of itself, by a set of drawings with an illustrative character and free of constraint that represent the following.

PREFERRED EMBODIMENT OF THE INVENTION

Figures 1, 2:
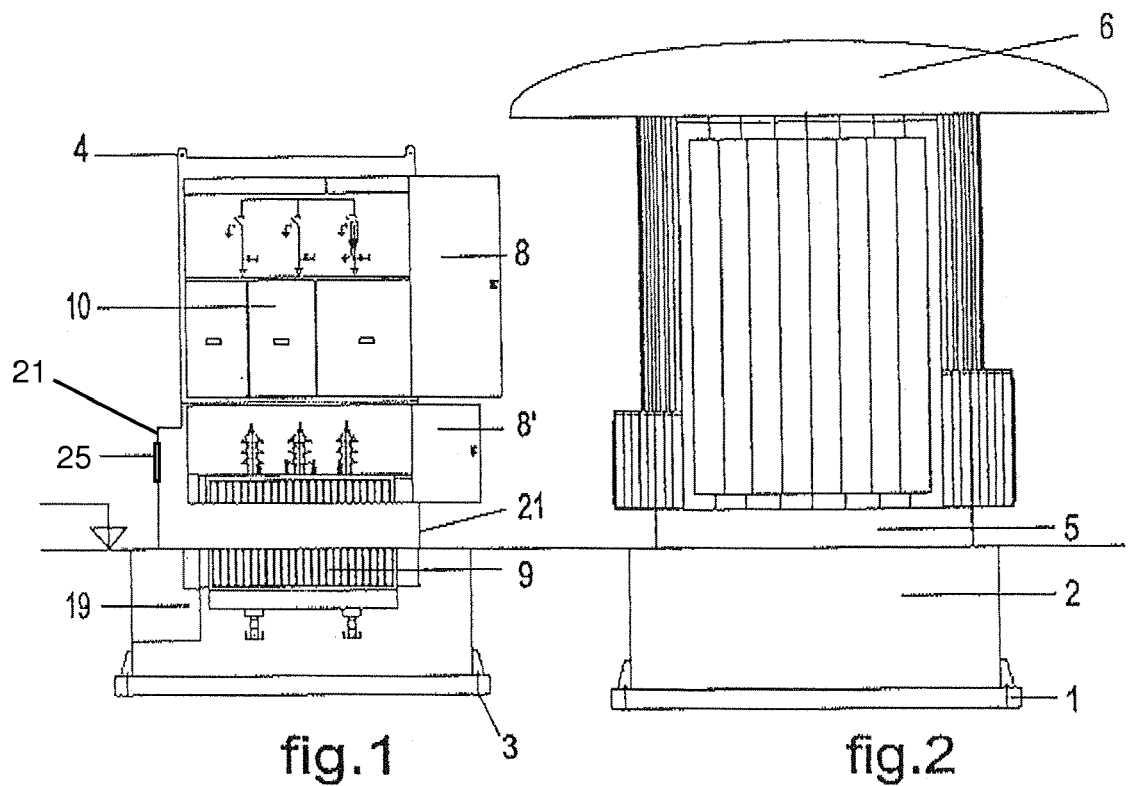
FIG. 1.—Shows a side view of the invented object, concerning the interior cabinet of the special urban transformation center.
FIG. 2.—Shows a side view of the invented object, concerning the outside housing of the special urban transformation center.
Figure 7:
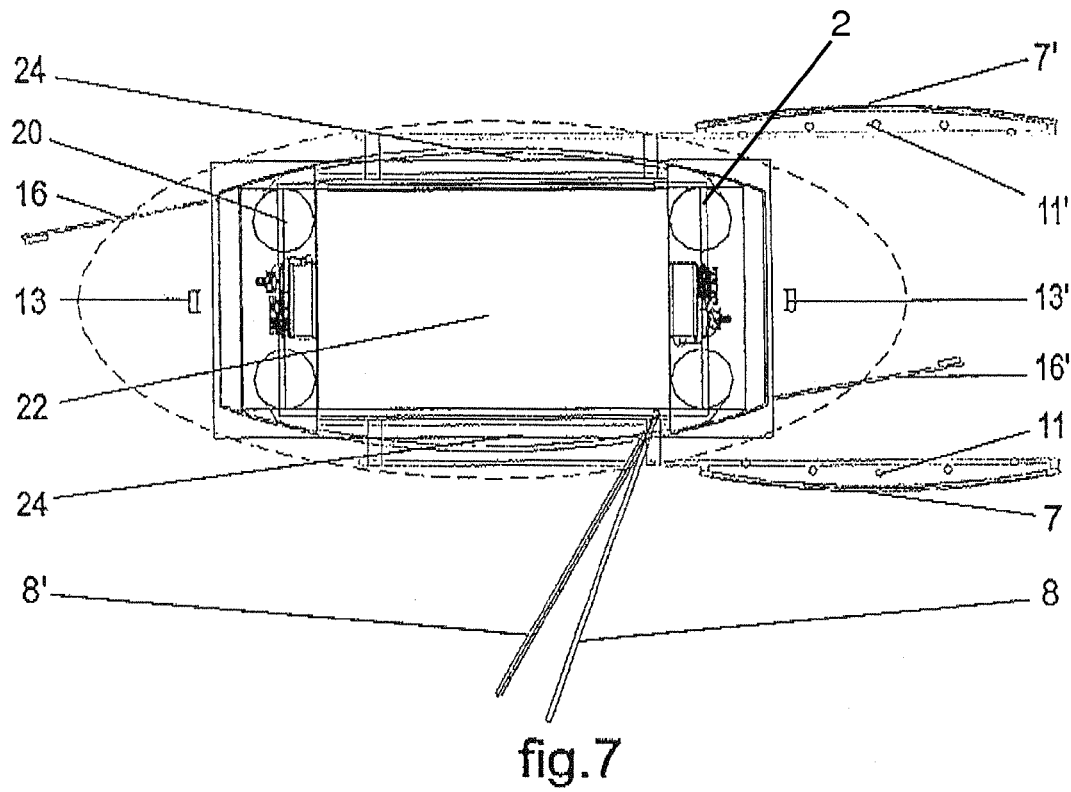

Studying these figures, it can be observed how the internal cabinet in FIG. 1 is placed on top of a concrete base (1) that fits into the excavation in the ground, with the internal cabinet erected on top of the base (1) having double walls (2) made out of metal sheets and vinyl ester (see FIG. 7) that adopts a polygonal configuration. Bolts (3) for fixing the internal cabinet to the concrete base (1) emerge from this base and are designated to support the whole structure that is resting on it, the upper part of the internal cabinet being closed by a ventilation grill and the lifting bolts (4) for collocation.

FIG. 2 shows that on ground-level and to level the external structure with the ground surface, there is a base (5) made out of stainless steel that coincides with the external enclosure, with a horizontal and a vertical step. The invention includes an internal/external skeleton, made out of stainless steel, reinforced with crossbeams, as well as the four pillars (20) situated between the base and the hood, and for the zenithal closing there is a roof (6) made of polyester, reinforced with fiberglass, which adopts the form of a spherical skullcap with an elliptical form.

Figure 3:
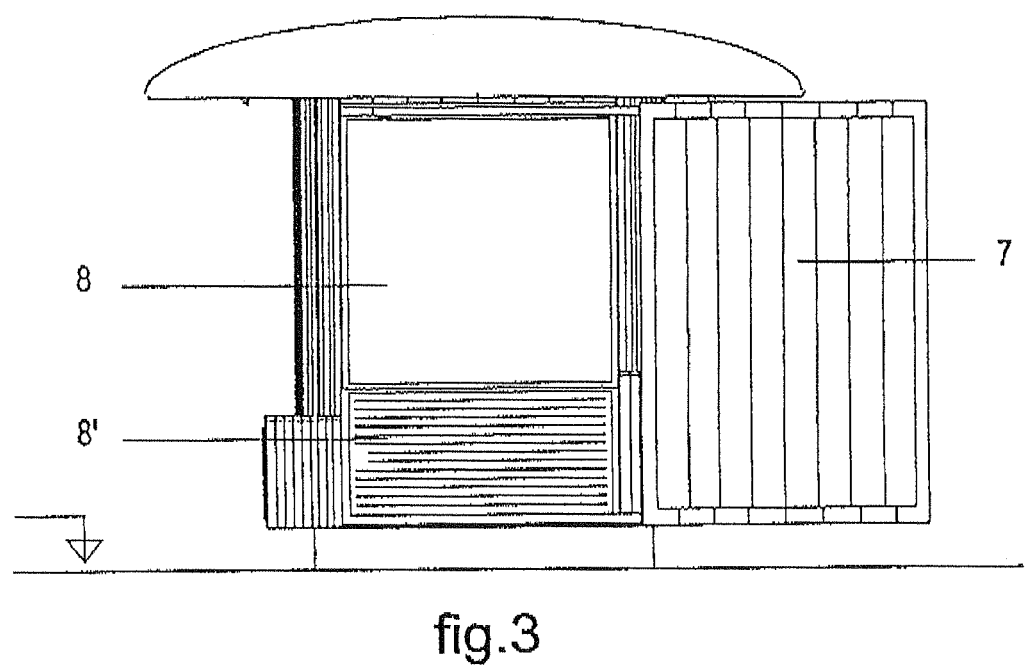
FIG. 3.—Shows a side view of the invented object, concerning the outside housing of the special urban transformation center, with a door that is opened.
Figure 4:
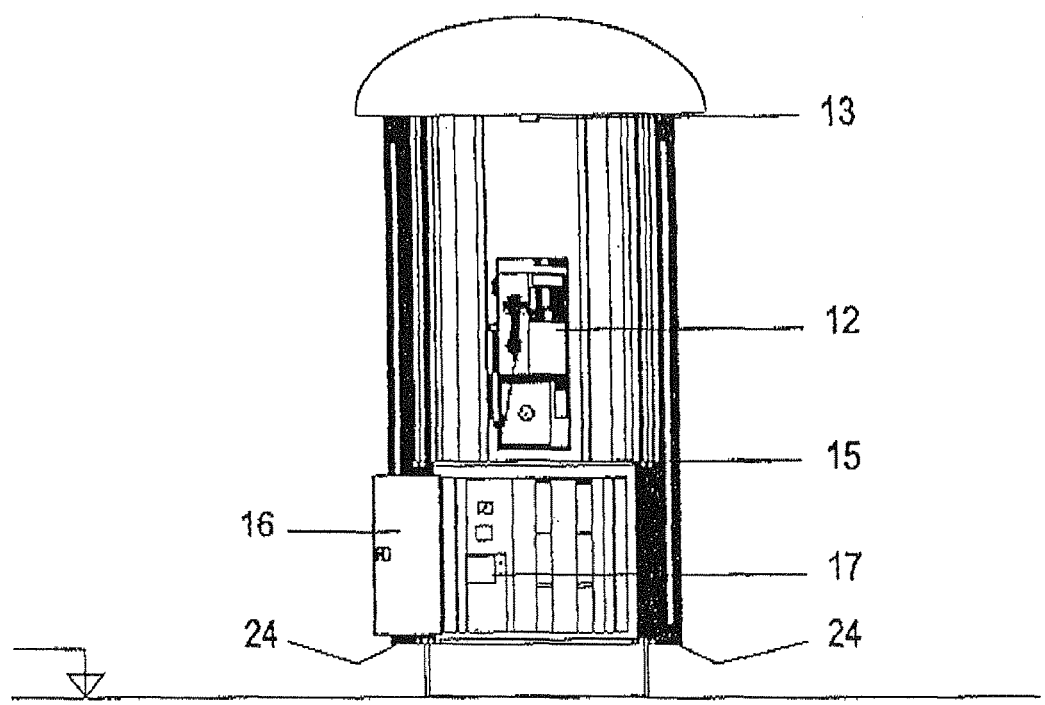
FIG. 4.—Shows a side view of the invented object, concerning the special urban transformation center, with one telephone cabin installed at a normalized level.
Figure 5:
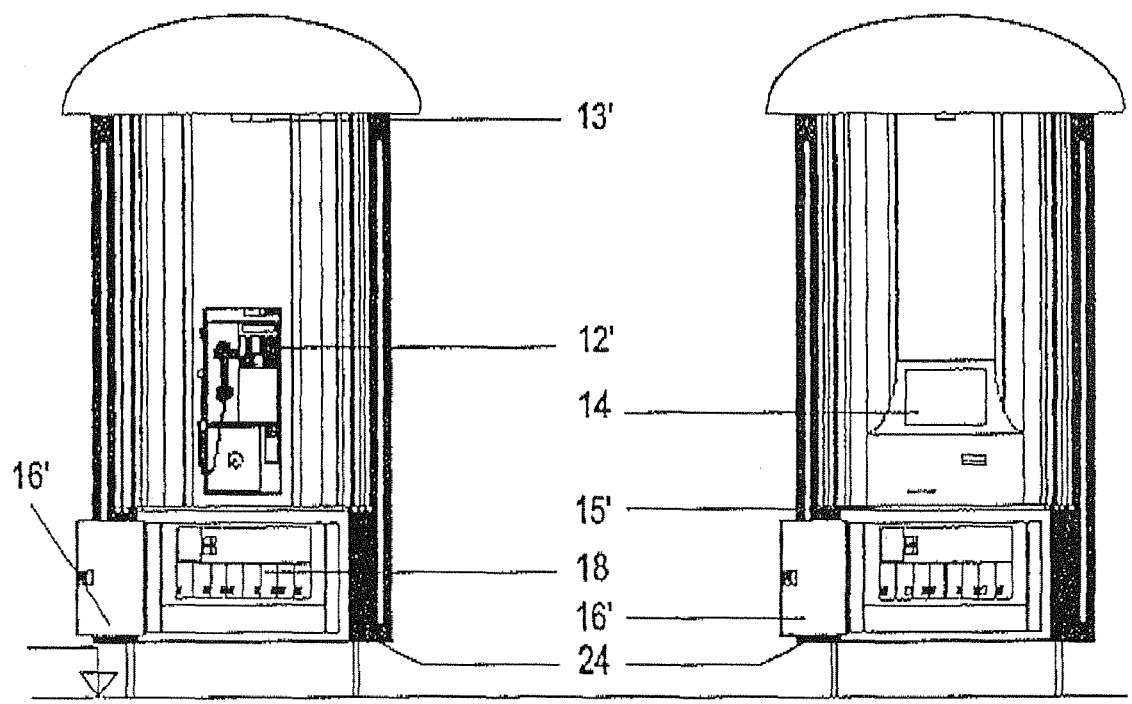
FIG. 5.—Shows a side view of the invented object, concerning the special urban transformation center, with one telephone cabin installed at a height that is adapted for use by physically handicapped people.
Figure 6:
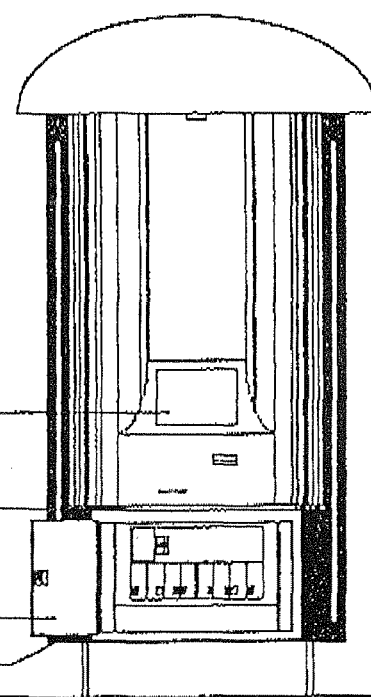
FIG. 6.—Shows a side view of the invented object, concerning the special urban transformation center, with an antivandalic computer touch screen, as an alternative for FIG. 5, to be used as a public multimedia information center, FIG. 7.—Shows a top view of the invented object, concerning the special urban transformation center, with doors, roof, and illumination of the telephone cabins.

The sides with the largest flanks (see FIG. 3.) are equipped with the sliding doors (7) and (7') with transparent polycarbonate windows and with special features which permit the placing of vertical urban advertising posters, and which, if opened, give access to the door (8) of the internal cabinet, to reach the room that contains the medium voltage cells (9), and to the door (8') to reach the room that contains the transformer (10).

The appropriate internal illumination (11) and (11') is installed in the interior of the doors that contain the advertising, as well as the opening mechanism for refurbishing the advertising in these doors.

On the other two remaining sides of the main body of the special urban transformation center, which are not equipped with doors (see FIGS. 4, 5, 6 and 7), two telephone cabins (12) and (12') are installed, and are illuminated by a zenithal light (13) and (13'), situated at a normal and reduced height. The invention includes the option to install an antivandalic computer touch screen (14) in (12') with the purpose to establish a multimedia information point. Below these the platforms (15) and (15') are situated to help and support the public user, serving as well as protection for the doors (16) and (16') and for the low voltage panel (17) and the telecontrol panel (18). In the inferior part of the telecontrol panel two medium voltage cases for entering the cables (19), cable guiding, are situated.

Figure 8:
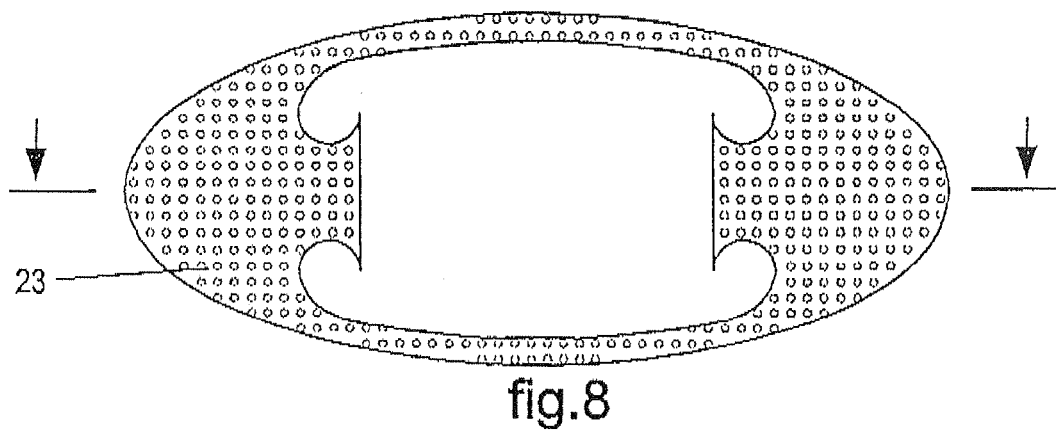
FIG. 8.—Shows a top view of the invented object, concerning the holes for evacuating the heat in the lower part of the hood of the special urban transformation center.
Figure 9:
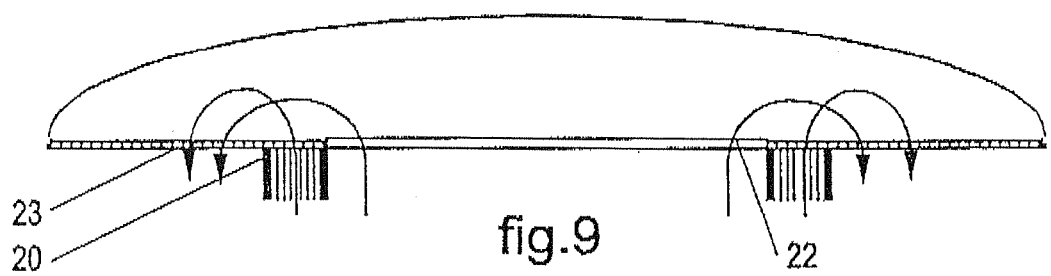
FIG. 9.—Shows a side view of the section subject of the drawing of FIG. 8., how the heat is evacuated, concerning the special urban transformation center.

FIGS. 8 and 9 illustrate that the heat that is produced by the transformer is evacuated through the four pillars (20) that function like chimneys, leaving from the internal closet through a grill (25) (see FIG. 1) situated in the inferior parts (specifically in the faces of the fronts) (21), and in the upper part of the cabinet (22), being transported to the outside through drill holes practiced in the inferior part of the zenithal closure (23), getting the renewal and the inflow of air at an atmospheric temperature through an inferior perimetrical entrance (24) (see FIGS. 4-7) located in the lower part of the doors that are used to carry publicity.

Figure 10:
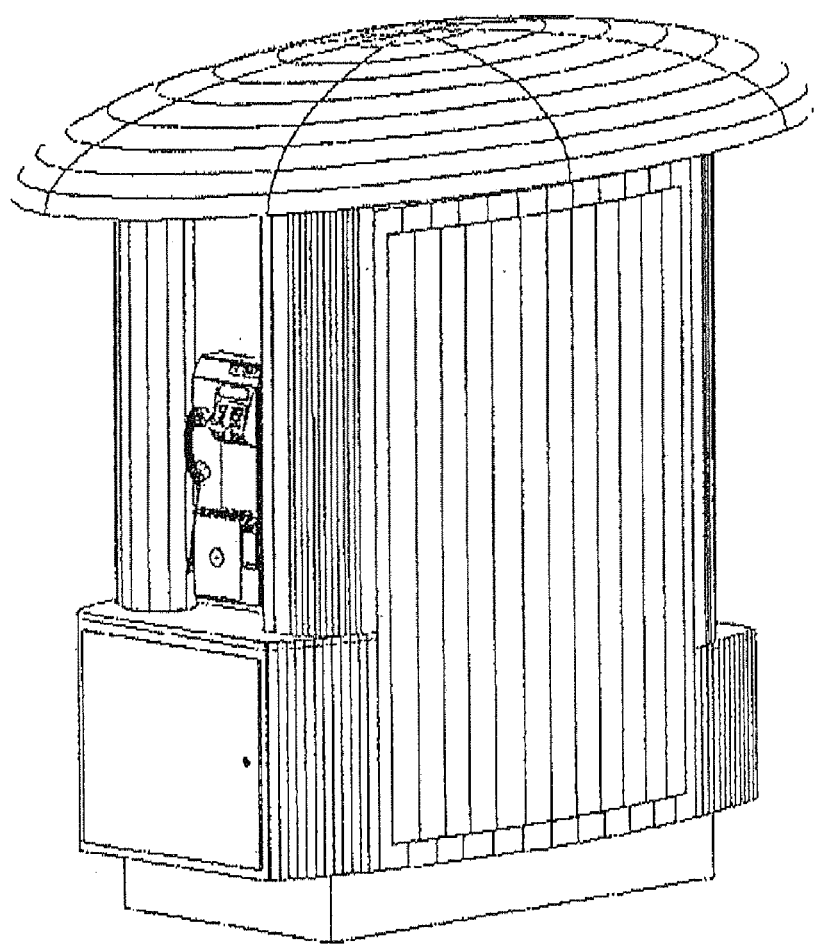
FIG. 10.—Shows a perspective view of the special urban transformation center, showing the aesthetical part of the invention.

FIG. 10 shows the aesthetical aspects of the special urban transformation center that emerges from the ground surface level.

Summarizing, the invention of the special urban transformation center houses, within a limited space, two telephone cabins, or either a telephone cabin and a touch screen, two illuminated spaces for normalized size advertising, a housing for an internal cabinet with a transformer center for electrical energy, the low voltage panel and the telecontrol panel.

The invention claimed is:

1. A special urban transformation center comprising:
   a concrete base;
   an interior cabinet comprising:
      a ventilation grill,
      double walls of steel and vinyl ester, and
      at least one access door;
   a transformer for medium or low voltage level;
   medium voltage cells;
   a low voltage panel;
   a telecontrol panel; and
   an external enclosure comprising:
      a body;
      at least one hollow pillar,
      a sliding door attached to the body,
      a roof that includes holes in a lower surface thereof, and
      closets for housing the low voltage panel and the telecontrol panel;
   wherein the transformer and the medium voltage cells are housed in the interior cabinet and are accessible through the at least one access door and the closets have doors for accessing the low voltage panel and the telecontrol panel; and
   wherein the at least one hollow pillar stands vertically between the base and the roof and provides a conduit that works in tandem with the ventilation grill to evacuate heat generated by the transformer from the interior cabinet to outside of the special urban transformation center through the holes in the lower surface of the roof.

2. The special urban transformation center according to claim 1 wherein when the sliding door of the external enclosure is opened, access is provided to the at least one access door of the interior cabinet for accessing the transformer and the medium voltage cells.

3. The special urban transformation center according to claim 1, wherein the sliding door comprises a space for carrying advertisements and parts for illumination of the advertisements.

4. The special urban transformation center according to claim 1, wherein the body of the external enclosure further comprises:
- two narrow sides that include a platform extending in a horizontal direction from each narrow side,
- a telephone cabin provided on one narrow side, and
- an antivandalic computer touch screen providing a multimedia information point provided on the other narrow side, wherein the platforms are situated on each narrow side below the telephone cabin and the computer touch screen to support a public user and protect the closet doors for the low voltage panel and the telecontrol panel.

5. The special urban transformation center according to claim 1, wherein an inflow of air at an atmospheric temperature is provided through an inferior perimetrical entrance located in a lower part of the sliding door to assist in the evacuation of heat from the interior cabinet.

6. The special urban transformation center according to claim 1, wherein the roof is elliptical and formed in a spherical skullcap shape.

\* \* \* \* \*